(No Model.)

J. M. PERRY.
NUT LOCK.

No. 277,336.

Patented May 8, 1883.

Witnesses:—
Thomas J. Patterson
William Billinge

James M. Perry,
Connolly Bros & McTighe.
Attys.

UNITED STATES PATENT OFFICE.

JAMES M. PERRY, OF SHARON, PENNSYLVANIA.

NUT-LOCK.

SPECIFICATION forming part of Letters Patent No. 277,336, dated May 8, 1883.

Application filed February 19, 1883. (No model.)

*To all whom it may concern:*

Be it known that I, JAMES M. PERRY, of Sharon, in the county of Mercer and State of Pennsylvania, have invented certain new and useful Improvements in Nut-Locks for Rail-Joints; and I do hereby declare that the following is a full, clear, and exact description of the invention, which will enable others skilled in the art to which it appertains to make and use the same, reference being had to the accompanying drawings, which form a part of this specification, in which—

Figure 1:
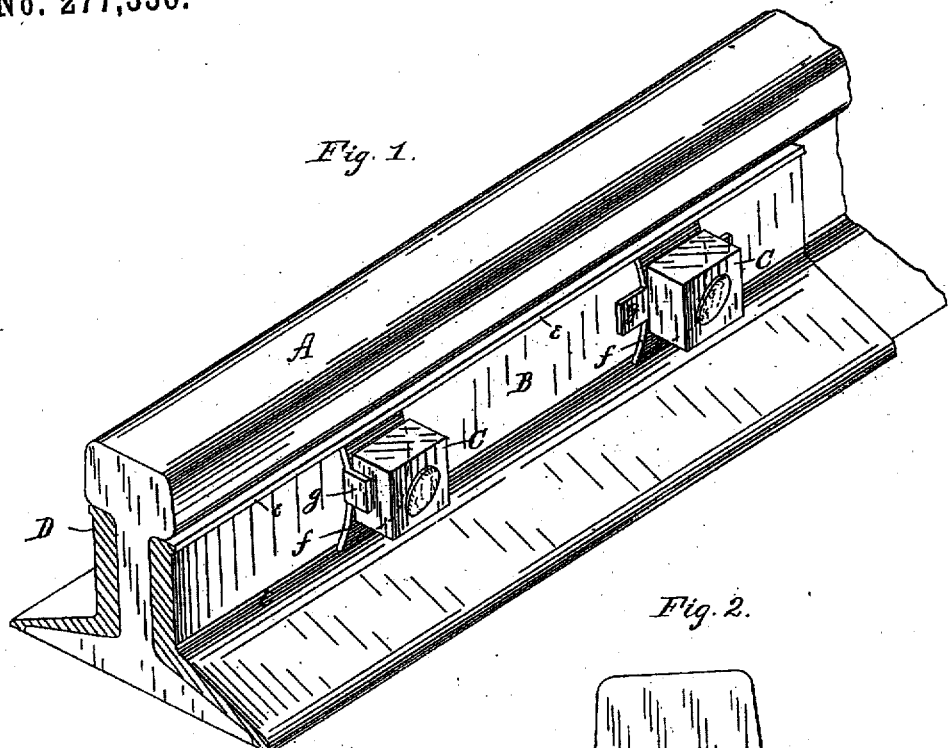
Figure 2:
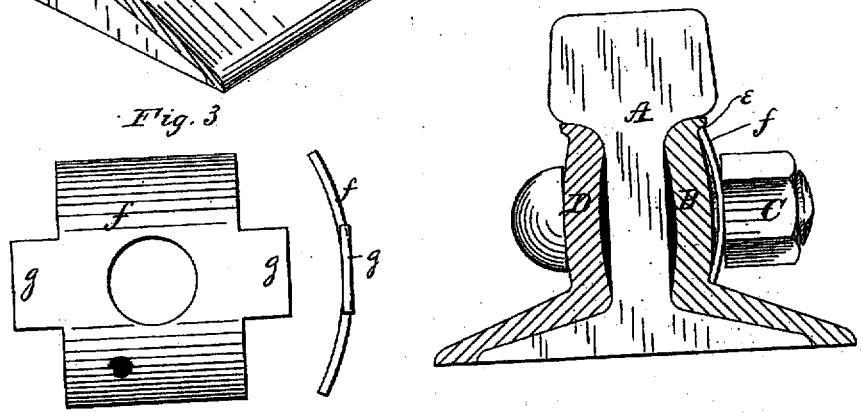
Figure 3:
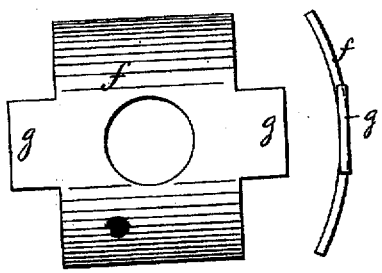
Figure 4:
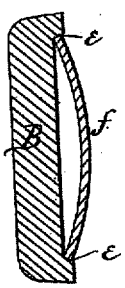

Figure 1 is an isometrical perspective of one part of a railway-rail joint with my invention applied. Fig. 2 is an end view of same. Fig. 3 shows the spring-washer in front and side elevation. Fig. 4 shows a section of the ordinary ribbed fish-bar with my spring locking-washer applied, ready for the bolt and nut.

This invention relates to nut-locks, and is intended for use on railway-rail joints where the joint is made by fish-plates or splice-bars held against the rails by bolts and nuts.

The invention consists in the construction, combination, and arrangement as hereinafter set forth and claimed.

In the drawings, A designates the rail, and B the splice-bar on the side at which the nuts C are applied. The other splice-bar, D, may be of any form; but the bar B is made of the "channeled" form—that is, with a rib or shoulder, e, along the upper and lower edge of its face, and projecting therefrom.

I make a spring-washer, f, having its top and bottom edges square and parallel, or substantially so, and bend it to curved form, the curvature being vertical, as shown. I prefer to make the washer f out of spring steel. The vertical length of the washer before bending is greater than the distance between the shoulders e on the bar B, and the bending is done to such extent that the washer will just enter with its edges between said shoulders or ribs. The nut is then applied and screwed on tightly. During the first stage of pressure by the nut upon the washer the latter is prevented from turning by reason of the shoulders e. Afterward the shoulders e prevent the washer f from flattening completely against the bar B. The result is that the outwardly-arched washer becomes a powerful compressed spring, locking the nut effectually, and fulfilling the same duty, as to transverse strength, as a solid flat washer.

The washers can be readily and cheaply manufactured, and as they do not depend, for locking the nuts, upon the life of a cutting edge or point, their durability is very great.

If desired, the washers f may be formed with one or more flaps, g, on their side edges, which can be folded or bent up against one or more sides of the nut and the lock rendered absolutely secure.

The washer has a bearing at top and bottom against the ribs or shoulders of the splice-bar, and hence cannot flatten out nor spread too far, and this fact insures its being always elastic and in a condition to lock the nut and keep it locked. Unscrewing the nut does not injure it, and therefore it may be used repeatedly.

I claim as my invention—

The combination, with the splice-bar having the ribs or shoulders e, of the vertically-arched spring-washer f, bearing at its top and bottom against said shoulders, and curved outwardly at the middle, and bolt and nut C, substantially as described.

In testimony that I claim the foregoing as my own I have hereto affixed my signature in presence of two witnesses.

JAMES M. PERRY.

Witnesses:
WILLIAM H. PERRY,
JAMES A. KENNEDY.